United States Patent
Boussier

(10) Patent No.: US 7,725,011 B2
(45) Date of Patent: May 25, 2010

(54) TEMPERATURE EXCHANGING ELEMENT MADE BY EXTRUSION AND INCORPORATING AN INFRARED RADIATION DIFFUSER

(75) Inventor: Jean-Jacques Boussier, Povoa de Lanhoso (PT)

(73) Assignee: Calorigen USA Corp., Miami, FL (US)

( * ) Notice: Subject to any disclaimer, the term of this patent is extended or adjusted under 35 U.S.C. 154(b) by 293 days.

(21) Appl. No.: 11/708,593

(22) Filed: Feb. 21, 2007

(65) Prior Publication Data

US 2007/0235438 A1   Oct. 11, 2007

Related U.S. Application Data

(63) Continuation-in-part of application No. 11/347,300, filed on Feb. 6, 2006, now Pat. No. 7,355,148.

(51) Int. Cl.
*A45D 20/40* (2006.01)
(52) U.S. Cl. ................. 392/407; 392/422; 392/426; 392/440
(58) Field of Classification Search .................. None
See application file for complete search history.

(56) References Cited

U.S. PATENT DOCUMENTS

| | | | |
|---|---|---|---|
| 2,944,138 A | 7/1960 | Goff | |
| 3,312,277 A | 4/1967 | Chitouras et al. | |
| 4,352,008 A | 9/1982 | Hofer et al. | |
| 4,558,209 A | 12/1985 | Hess | |
| 4,637,111 A | 1/1987 | Pasternak et al. | |
| 4,669,535 A | 6/1987 | Seidler | |
| 4,822,980 A | 4/1989 | Carbone et al. | |
| 5,343,362 A | 8/1994 | Solberg | |
| 5,653,280 A | 8/1997 | Porter | |
| 5,991,151 A | 11/1999 | Capriz | |
| 6,068,051 A | 5/2000 | Wendt | |
| 2003/0155099 A1* | 8/2003 | Montague, Jr. ............... | 165/47 |
| 2004/0238162 A1 | 12/2004 | Seiler et al. | |

FOREIGN PATENT DOCUMENTS

ES   2 182 617   3/2003

* cited by examiner

*Primary Examiner*—Thor S Campbell
(74) *Attorney, Agent, or Firm*—Oliff & Berridge, PLC

(57) ABSTRACT

The invention thus relates to a radiation module incorporating a support, at least one heating and/or heat conducting element and a temperature exchanging element made by extrusion and constituted by a single-piece base with an internal face incorporating at least one means to integrate the heating and/or heat conducting element and an external face incorporating radiation fins wherein the module incorporate a diffuser receiving infrared radiation from the temperature exchanging element, said diffuser enabling infrared radiation to be emitted of a wavelength that is less than that of the radiation received.

18 Claims, 4 Drawing Sheets

TEMPERATURE EXCHANGING ELEMENT MADE BY EXTRUSION AND INCORPORATING AN INFRARED RADIATION DIFFUSER

This is a Continuation-in-Part of application Ser. No. 11/347,300 filed Feb. 6, 2006. The disclosure of the prior application is hereby incorporated by reference herein in its entirety.

BACKGROUND OF THE INVENTION

1. Field of the Invention

The technical scope of the present invention is that of thermal exchange devices, and more particularly infrared radiation heating devices.

2. Description of the Related Art

Heating and maintaining a constant temperature in a room or building is a principal concern for architects and heating engineers who must plan for and provide one or several heating sources according to the geometry of the room to be heated. Numerous means to heat a room are known: floor heating, forced-air heating, convector heating, and radiant heating or a combination of convection and radiant heating. Radiators are currently the most common heating means. They classically incorporate a support onto which a temperature exchanging element and a heating element are attached. The temperature exchanging element generally incorporates cooling fins arranged vertically in the case of natural convection and in parallel to the air circulation in the case of forced convection.

Air conditioning systems have several drawbacks. A first drawback lies in the cost of manufacture and installation. Another drawback lies in the fact that a flow of air often generates medical problems for the users (development of germs in the system, chills, etc.). Another drawback lies in the poor efficiency of these energy-consuming systems. Another drawback lies in the noise generated by the air circulation.

SUMMARY OF THE INVENTION

The aim of the present invention is to supply a temperature exchange element offering a large exchange area and dissipating the energy in the form infrared radiation of medium wave and low temperature and providing a technical solution to the drawbacks mentioned above.

By low temperature, we mean a temperature of less than 70° C.

Such a device incorporates several elements of specific shape. This is particularly the case of heat diffusing fins and diffusers which, in order to have a large radiation surface, are particularly complex in shape. However, new extrusion techniques used on materials, and principally on aluminum, also enable radiators to be made at a lesser cost than for molded radiators. Moreover, extrusion allows certain dimensions of the radiator to be adapted as a function of the characteristics of the room to be heated.

The invention thus relates to a radiation module incorporating a support, at least one heating and/or heat conducting element and a temperature exchanging element made by extrusion and constituted by a single-piece base with an internal face incorporating at least one means to integrate the heating and/or heat conducting element and an external face incorporating radiation fins, wherein it incorporates a diffuser receiving infrared radiation from the temperature exchanging element, said diffuser enabling infrared radiation to be emitted of a wavelength that is higher than that of the radiation received.

According to one characteristic of the invention, the support is in the form of a receptacle and the diffuser constitutes a lid for this receptacle, so as to form a closed space holding the temperature exchanging element and the heating element and/or heat conducting element.

According to another characteristic of the invention, the diffuser has an internal reception face oriented towards the diffusion fins and an external emission face whose surface area is greater than that of the reception face.

According to yet another characteristic of the invention, the internal reception face of the diffuser is substantially smooth and the external emission face is corrugated or has protrusions so as to present an emission surface that is greater than the reception face surface.

According to another characteristic of the invention, the fins are substantially perpendicular to the base and are substantially parallel to one another, the fins and the base constituting by a single-piece.

According to another characteristic of the invention, the fins have an edge with a profile matching that of the reception means and are made integral with the base through the insertion of the matching profiles in the reception means of the fins.

According to yet another characteristic of the invention, the fins have a shape that is substantially that of the arc of a circle.

According to another characteristic of the invention, the fins are arranged concavely on one part of the base and convexly on the other part of the base.

According to another characteristic of the invention, the temperature exchanger element incorporates a central element constituted by two fins of opposite curvature integral with one another.

According to another characteristic of the invention, the fins have a corrugated profile so as to increase the heat exchange surface.

According to another characteristic of the invention, each base incorporates hooking means at its two side ends enabling several bases to be arranged side by side and joined together.

According to another characteristic of the invention, the integration means for a heating element are in the form of rails between which a heating element may be inserted.

According to another characteristic of the invention, the heating element is a woven resistor, a heating brick or a self-regulating resistance.

According to another characteristic of the invention, the heating element is in the form of a flexible composite material, substantially flat and able to mould itself to the inner face of the base.

According to another characteristic of the invention, the heating element is bonded to the inner face of the base and is powered by an electrical source.

According to another characteristic of the invention, the heating conducting means are formed of a cooling element composed of at least one tube in which a heat conducting fluid circulates.

According to one characteristic of the invention, the temperature exchanger element is made of extruded aluminum.

According to another characteristic of the invention, the diffuser emits infrared radiation whose wave length is between 7 and 15 μm and more particularly between 7.4 and 10 μm.

The invention also relates to a temperature control device for a room or a vehicle, wherein it incorporates a temperature sensor and at least one radiation module, and wherein it is in an elongated shape, relatively narrow, so as to be used as a baseboard, as a temperature exchanging profile for the ceiling or as a post for an opening or as a 360° radiation column.

A first advantage of the device according to the invention lies in its modularity.

Another advantage lies in its low manufacturing cost.

Another advantage lies in the possibility of being able to produce a device of specific dimensions, shape and appearance at low cost.

Another advantage lies in the fact that none of the apparent parts of the radiation module is at a high temperature, thereby avoiding any risk of burning persons or objects in contact with the device.

Another advantage lies in the simplicity and rapidity with which the device is assembled.

Another advantage lies in the high efficiency of the temperature exchanging element and the devices implementing it.

Another advantage lies in the fact that the radiation area of the radiation module may be modified by replacing one or several fins by fins of different shapes.

Another advantage lies in the fact that the radiation area of the radiation module may be modified by replacing the diffuser by another diffuser of different shape.

Another advantage lies in the fact that the temperature-exchanging element has a large exchange area.

Another advantage of a specific embodiment of the invention lies in the fact that the temperature-exchanging element made of extruded aluminum provides very good heat conductivity.

Another advantage lies in the fact that the invention enables the diffusion of heat to be eliminated by the stratification of hot air at ceiling height thereby reducing energy consumption.

BRIEF DESCRIPTION OF THE DRAWINGS

Other characteristics, particulars and advantages of the invention will become more apparent from the following description given by way of illustration with reference to the appended drawings, in which.

DETAILED DESCRIPTION OF PREFERRED EMBODIMENTS

The operating principle implemented in the temperature exchanging element according to the invention is that of the use of a reduced ΔT (temperature difference) between the temperature production source and the source of use, thereby inducing a substantial improvement in efficiency, and consequently a substantial reduction in energy consumption. The temperature-exchanging element may be used in radiator mode to warm a room or in evaporator mode to reduce the temperature in a room. By reduced ΔT between the temperature production source and the source of use, we mean a difference in temperature less than 95° C. (in opposition to traditional combustion or resistance-based convectors where the ΔT is of several hundred degrees, beyond 200° C.).

Figure 1:
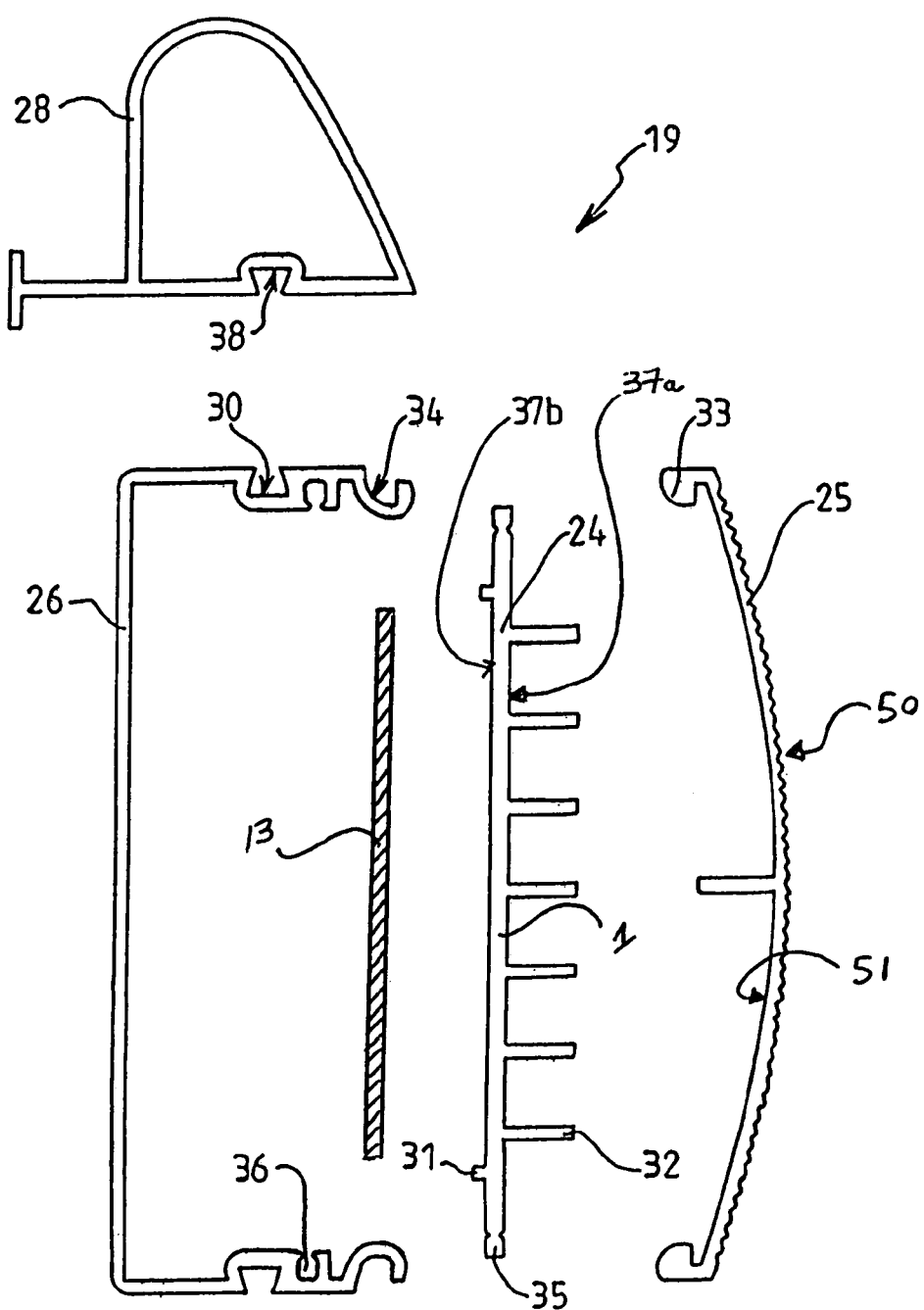
FIG. 1 shows an exploded view of an embodiment of a radiation module according to the invention.

FIG. 1 shows an exploded view of one embodiment of a single radiation module according to the invention. In this embodiment, the radiation module 19 incorporates a support 26, a diffuser 25, a temperature-exchanging element 24 arranged between the support 26 and the diffuser 25 and an heating element 13.

The temperature exchanging element 24 is in the form of a substantially plane base 1 which incorporates an external face 37a provided with fins 32 substantially perpendicular to the base 1 and substantially parallel to one another and an internal face 37b opposing the external face and provided with rails 31 between which the heating element 13 may be positioned. The temperature exchanging element 24 is shown as a single piece and incorporating straight fins 32, but a temperature exchanging element such as the one described hereafter with reference to FIG. 3 may very well be implemented without departing from the scope of the invention. Similarly, the radiation module may be equipped with a heat-conducting element such as will be described hereafter.

The diffuser 25 has an internal reception face 51, which is substantially smooth and oriented towards the diffusion fins, and an external diffusion face 50 incorporating corrugations so as to increase the emission area with respect to the reception area. The difference in surface area between the internal face 51 and external face 50 of the diffuser 25 advantageously enables the diffuser to receive infrared radiation from the temperature exchanging element and to emit infrared radiation at a wave length that is higher than the wave length of the received radiation.

In this embodiment, the internal face 51 of the diffuser 25 is smooth and the external face 50 is corrugated, such corrugation formed by a succession of concave and convex curves. Such an embodiment advantageously enables a diffuser to be obtained whose external emission face has a surface area greater than that of the internal reception face. The corrugations of the external face may also be replaced by another shape, for example triangular, or by protrusions. Note however that a convex external face with concave/convex corrugations has the advantage of evenly diffusing the infrared waves. The difference in area of the external face 50 and internal face 51 of the diffuser 25 advantageously enables the thermal load applied to the diffuser to be reduced, thereby modifying the wave length between the infrared radiation received and emitted by the diffuser. Generally speaking, infrared radiation of between 7 μm and 15 μm can be emitted.

Fairings 28 are provided to be fastened on either side of the radiation module 19. The support 26 is provided with grooves 36 with a profile matching that of the ends 35 of the temperature exchanging element 24 so that this may be made integral with the support 26 by sliding its ends 35 into grooves 36. The diffuser 25 incorporates pins 33 at its ends. The support 26 also incorporates channels 34, of a profile matching that of the pins 33 of the diffuser 25 so that the diffuser may be made integral with the support by sliding its pins 33 into the channels 34. Lastly, the support 26 and fairings 28 respectively incorporate dovetailed profiles 30 and 38 allowing them to be joined together. Note that on this Figure, the support 26 forms a receptacle whose diffuser 25 constitutes the lid so as to form a closed space enclosing the temperature exchanging element 24 and the heating and/or heat conducting element. Such an embodiment advantageously enables any circulation of air to be prevented in the module 19, which would be detrimental to the functioning of the device according to the invention. Indeed, a circulation of air would cool the temperature exchanging element 24 and diffuser thereby reducing the radiation capacity of the module.

The module thus produced may have different dimensions. In a specific embodiment, the radiation module is of an elongated shape with a reduced width so as to be used as a base board, a post for an opening or ceiling profile. By "reduced in width" we mean a distance between the diffuser 25 and the bottom of the support 26 of around a few centimeters, for example 16 cm. In another embodiment, the radiation module will be of a width from a few centimeters to several decimeters and will be of a length of between 10 centimeters and several meters.

Figure 2:
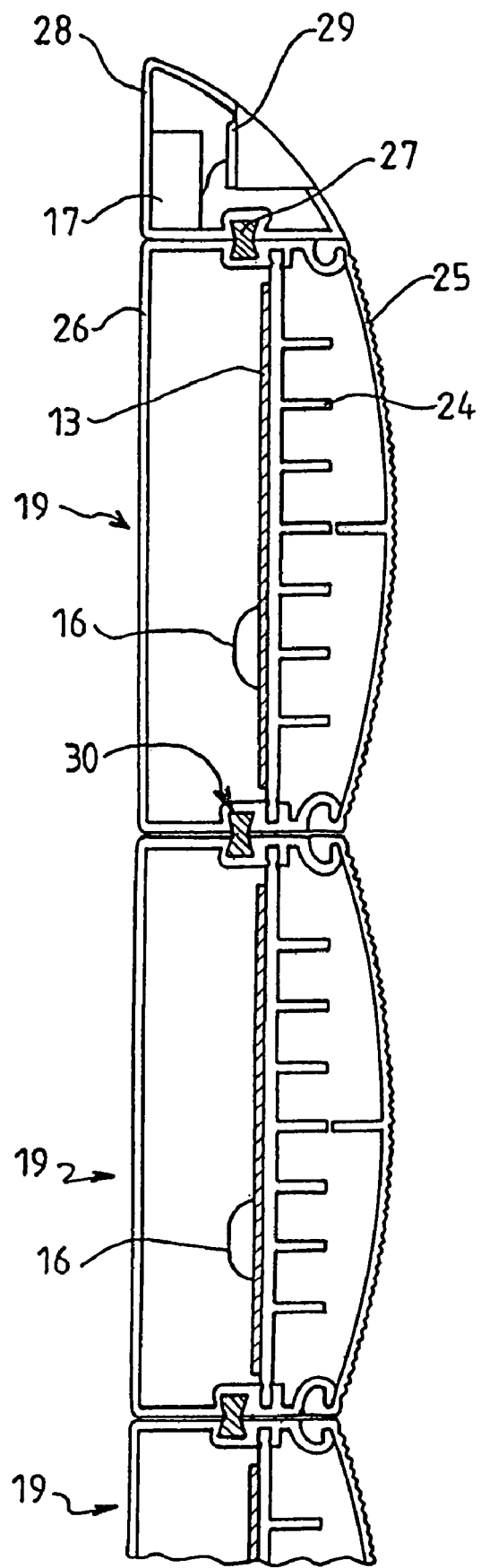
FIG. 2 shows an example of the use of a temperature radiation module according to the invention.

FIG. 2 shows an embodiment of a temperature control device, which could be a towel dryer or an electric heater, incorporating several temperature exchangers according to the invention. The temperature control device is made using several radiation modules 19 joined to one another and a fairing 28 (of which only two modules are shown). In this embodiment, the radiation modules 19 and fairing 28 are joined by means of double dovetailed profile parts 27 cooperating with matching profiles on the support 26 of modules 19 and fairing 28. The fairing 28 is in such a shape as to harmoniously prolong the diffuser 25.

Each radiation module 19 incorporates an electric heating element 13 in the form of a flexible composite material, substantially flat and molding itself to the inner face 37b of the temperature exchanging element 24, and a temperature sensor 16. A computer 17 is electrically connected to the different temperature sensors 16, to the electrical power supply of the heating elements 13 and to a user interface 29. The user interface enables the user to determine the operational parameters of the dryer (or heater) and to visualize the operational data such as the temperature to emit or the drying (or heating) power. The computer acts as a temperature control means by regulating the electrical power diffused by the heating element according to the ΔT measured between the value recorded and the temperature measured. In this embodiment, the computer 17 and the user interface 29 are advantageously arranged in the fairing 28. The invention may obviously be produced by arranging these elements outside of the dryer/heater, for example on a wall or home automation control panel.

The temperature regulating device according to the invention operates as follows: further to a user command, or to the detection of a temperature below the trigger threshold, the heating element 13 is switched on. The heat produced by the heating element 13 propagates by conduction in the exchanger 24. The fins 32 (and to a lesser extent, the external face 37a) transform the heat received by the exchanger element into infrared radiation. The infrared radiation is absorbed by the internal face 51 of the diffuser 25 and transformed into heat diffused by conduction to the external face 50 of the diffuser. The external face 50 transforms the heat of the diffuser into infrared radiation at a wave length that is higher than that of the radiation received by the internal face 51. The radiation emitted in the room to be heated has a wave length that is too long to heat the air molecules, it essentially manages to heat the source of use, which are the objects and individuals present in the room, by infrared radiation.

So as to improve the efficiency of the radiation module, the internal face 51 of the diffuser as well as the external face 37a and the fins 32 of the temperature exchanging element may be colored black. Such coloration may be obtained by chemical treatment (for example oxidation), or by the addition of a colored coating. Indeed, a black mat coloration enables the emissivity and collection rate of the colored surfaces to be increased (black body principle).

Figure 3:
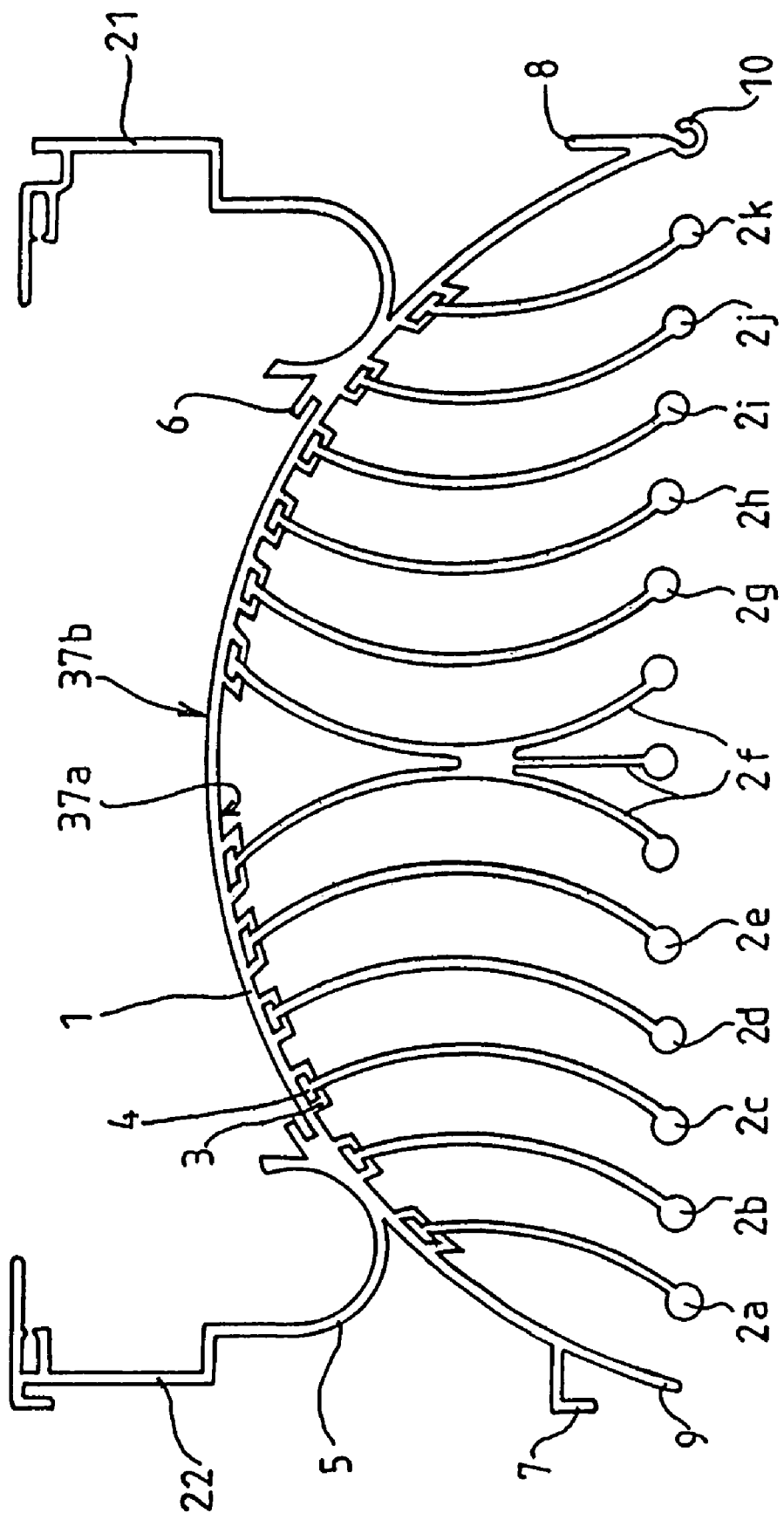
FIG. 3 shows a variant embodiment of a temperature exchanging element.

FIG. 3 shows another embodiment of a temperature-exchanging element 20 according to the invention.

In this embodiment, the temperature-exchanging element 20 incorporates a single-piece extruded base 1 onto which heat-exchanging fins 2a to 2k made by extrusion are attached. The single-piece base 1 has an external face 37a provided with guide rails 3 constituting reception means for the radiation fins and an inner face 37b provided with means 6 to integrate a heating element and means 5 to integrate a heat conducting element. The guide rails 3 and the integration means 5, 6 are joined to the base 1 and are made when the base is being extruded. The heat conducting element integration means 5 have a substantially semi-circular profile able to receive a substantially tubular heating element. The heating element integration means are here formed of tongues 6 able to hold a flexible and substantially flat heating element (for example a heating fabric) in place, which could be bonded to the inner face 37b.

Each fin 2a to 2k is separate from the others and on one edge has a profile 4 matching that of the guide rails 3 so as to be made integral with the base 1 by sliding its edge 4 into the guide rail 3 of the base 1. Fins 2a to 2k have a profile that is substantially in the shape of the arc of a circle. In this embodiment, fins 2a to 2e are shown arranged concavely on one part of the base 1 and 2g to 2k are arranged convexly on another part of the base 1. A central element 2f is formed of two fins of opposing curvature joined together at one part of their contact surface.

The base 1 is provided on one side (to the left of the Figure) with a protrusion 9 and a hook 7 and on the other side (to the right of the Figure) with a hook 10 and a tongue 8. These elements allow several temperature-exchanging elements to be joined together, or joined to a support not shown here. The base 1 is also provided with two lugs 21 and 22 enabling it to be fastened in the support.

The exchanger as described enables a low ΔT between the temperature source of production and source of use, which is not the case of known devices.

Figure 4:
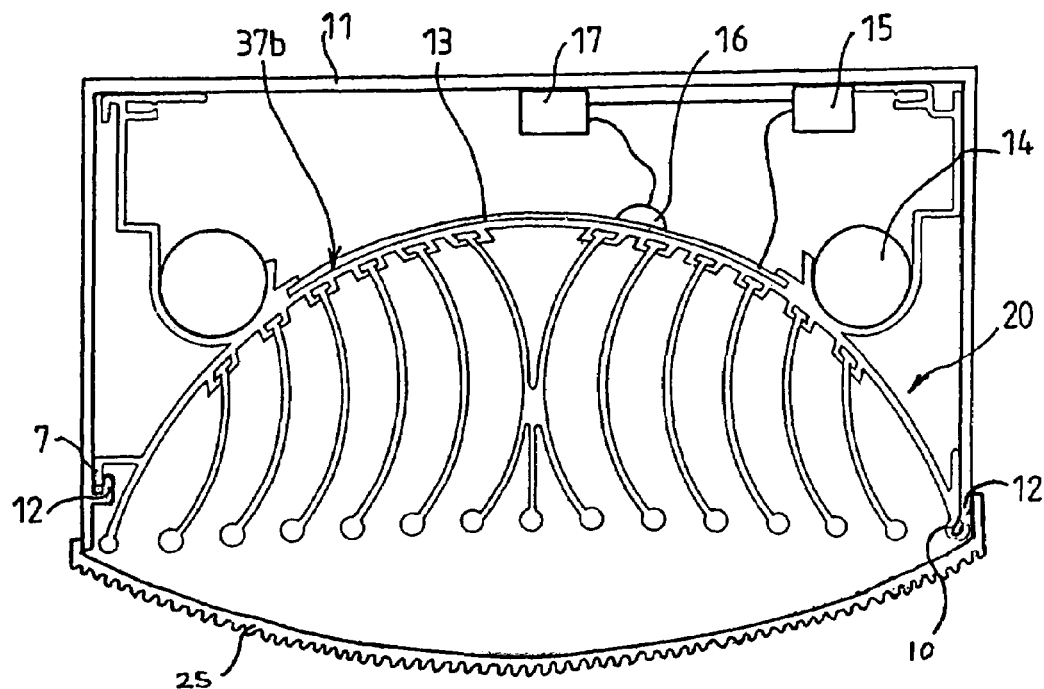
FIG. 4 shows an embodiment of a temperature regulating device.

FIG. 4 shows an embodiment of a temperature control device 18 according to the invention. The temperature control device 18 incorporates a temperature exchanging element 20 such as that described previously with reference to FIG. 1, and electrical heating element 13, a heat conducting element 14, a temperature sensor 16, a computer 17, a support 11 for the temperature exchanging element and a diffuser 25.

The support 11 incorporates hooking means 12 cooperating with hooking means 7 and 10 of the temperature exchanging element 20. Lugs 21 and 22 of the base press on the bottom of the side panel of the support 11.

The heating element 13 is in the form of a flexible composite material, substantially flat which moulds itself to the inner face 37b of the base 1 of the temperature-exchanging element 20. The heating element is for example a heating fabric powered by an electrical source 15 and bonded to the inner face 37b of the base 1. The temperature sensor 16 is directly fastened to the heating element 13 or to the base 1 so as to constantly monitor the temperature diffused. The temperature sensor 16 and the electrical source 15 are connected to the computer 17 which regulates the energy supplied to the heating fabric according to the difference between the temperature measured and the temperature required.

The heating conducting means 14 are formed of a cooling element composed of two tubes 14 in which a cooling fluid circulates.

Such an arrangement advantageously enables a temperature control device to be obtained that can both act as a radiator by implementing the heating element 13 and an air conditioner by implementing the cooling element 14. It goes without saying that such a device functions either in radiator mode or in air conditioning mode, separately.

Advantageously, the use of a low power flexible composite material bonded to the rear part of the temperature exchanging element enables the temperature of the heat producing source to be maintained at a much reduced level, thanks to the large exchange area provided by the fins. Thus, the invention allows a room to be heated by the dissipation of radiant heat at a ΔT of around 8° C. The reduction of the ΔT increases efficiency and reduces energy consumption.

Figure 5:
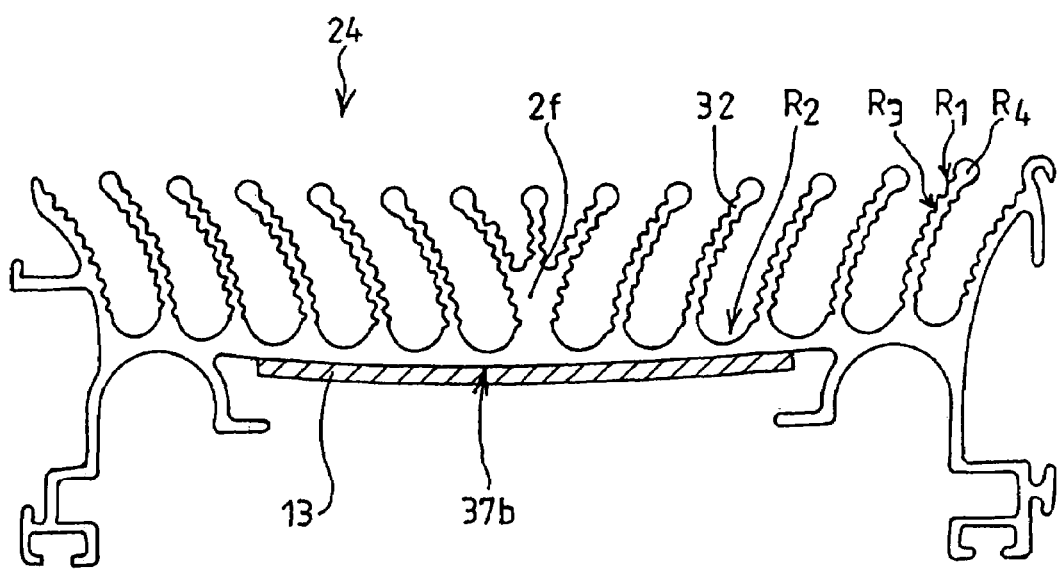
FIG. 5 shows another variant embodiment of a temperature exchanging device.

FIG. 5 illustrates a variant embodiment of a temperature exchanging element incorporating a central element 2f constituted by two fins of opposing curves joined at part of their contact surface. The fins, as well as the central element, have a corrugated profile so as to increase the heat-exchanging surface. An electrical heating element 13 is in the form of a flexible composite material bonded to the inner face 37b of the temperature-exchanging element.

In this embodiment, the fins 32 are corrugated on each of their faces. The corrugation of the fins 32 is made by a succession of concave curves of radius R3 and convex curves of radius R1. The ends of the fins have a circular profile of radius R4. The exchanger element also has a semi-circular profile of radius R2 between each fin.

Corrugating the fins provides an increase in exchange surface of more than 40% with respect to a profile that does not have such corrugations. Thus, depending on the effect required, the fins may have a corrugated profile on one or two faces, this profile being extended over the full length of the fin or solely on one portion of the fin, as may be seen in FIG. 8 at the base of the fins.

Generally speaking, and for all the devices and elements in the invention, the use of fins of different shapes firstly enables different aesthetic effects and secondly different technical effects to be produced. Thus, the use of curved or corrugated fins provides a higher thermal exchange surface, thus improved efficiency of the heating device. Any other form of fin may naturally be provided.

Such an arrangement may only be obtained by extrusion. Indeed, only extrusion enables such matching shapes to be made accurately. Such accuracy thus enables the base and fins to be accurately assembled and guarantees the proper thermal continuity between these parts. The elements constituting the invention will preferably be made of aluminum or one of its alloys. Indeed, aluminum has thermal properties that are particularly well adapted to the production of temperature exchanges and has mechanical properties adapted to extrusion.

Advantageously, the use of low power flexible composite heating material bonded to the rear part of the temperature exchange element enables, thanks to large exchange area of the fins, the temperature of the heat production source to be limited to a much reduced level. Thus, the invention enables a room to be heated by dissipation of radiating energy at a ΔT of around 95° C. between the temperature production source and its source of use. The reduction in the ΔT improves the efficiency, reduces the energy consumption and avoids convection.

Another advantage lies in the fact that the temperature exchanger element is made of extruded aluminum thereby enabling the use of small thickness of metal, inducing the immediate transfer of heat by conduction and eliminating any thermal inertia. This results in the almost total elimination of the infrared radiation at the rear part of the radiator.

Another advantage of the invention lies in the fact that use with a low ΔT induces negligible dilation and thus an absence of noise and stresses linked to the dilation of the different elements.

Yet another advantage lies in the fact that the temperature exchanger element enables radiation to be both vertical and horizontal by 180°, thereby evenly distributing the radiant heat.

Advantageously, this device does not require any parts to fix the different elements, nor does it require welding, allowing it to be simple and quickly assembled for a reduced cost. Moreover, such a device has the advantage of being able to be sold in kit form in order to be assembled by the user. Sale in kit form means the advantage of having a radiator of relatively low bulk, thereby reducing storage and transport costs.

Advantageously, this device constitutes a hybrid radiator enabling the use of an electrical source, a heating (or cooling) source or the simultaneous use of several power sources.

Radiation modules, or ceiling profiles may also be made according to a specific embodiment of the invention in long lengths, and able to nest into one another or be connected together.

One advantage of the use of extruded aluminum lies in the excellent thermal conduction characteristics of aluminum. These characteristics enable the use of heating element operating at low temperature. Thus, self-regulating resistances (known as PTC resistances) can be used as heating elements. Such an association enables the invention to be particularly efficient.

Another advantage of the invention lies in its functioning at low temperature. Indeed, the higher the temperature of a body, the shorter the wave length of the infrared radiation it emits. Thus, by reducing the emission temperature of a radiator, the length of the waves emitted is increased and the emission frequency is reduced. Thus, commonly used high temperature heating elements (i.e. those over 200° C.) emit radiation of between 0.2 μm and 5 μm, whereas a low temperature radiator enables radiation of between 7 μm and 15 μm to be obtained. Advantageously, infrared emission whose wave length is between 7 μm and 15 μm enables the persons present in a room to be warmed, while the energy lost by heating the air in the room is trifling. Trials performed on a radiation module in accordance with FIG. 2, provided with woven resistors of 1500 W enabled the following values to be obtained:

| Exchanger element 24 | | External face 50 of the diffuser | |
| --- | --- | --- | --- |
| Temperature (in ° C.) | IR radiation measured (in μm) | Temperature (in ° C.) | IR radiation measured (in μm) |
| 65 | 8.57 | 20 | 9.89 |
| 75 | 8.03 | 30 | 9.56 |
| 85 | 8.09 | 40 | 9.26 |
| 90 | 7.98 | 50 | 8.97 |
| 100 | 7.77 | 60 | 8.70 |
| 115 | 7.47 | 70 | 8.45 |

Thus, the radiation module according to the invention advantageously enables infrared radiation of between 7.4 μm and 10 μm to be emitted. Naturally, by adapting the dimensions and characteristics of the radiator, the wave lengths emitted by the diffuser may be modified. Thus, the radiation module according to the invention enables infrared radiation to be produced whose wave length is between 7 μm and 15 μm.

What is claimed is:

1. A radiation module comprising:
   a support;
   at least one heating and/or heat conducting element;
   a temperature exchanging element made by extrusion and comprising at least a single-piece base with a first face that includes at least one means to integrate the heating and/or heat conducting element, and a second face that includes radiation fins; and
   a diffuser that is separate from the temperature exchanging element and that receives infrared radiation from the temperature exchanging element and the diffuser enables infrared radiation to be emitted at a wavelength that is higher than that of the radiation received, wherein:
   the first face of the temperature exchanging element is an external face that is oriented towards the support and the second face of the temperature exchanging element is an external face that is oriented towards the diffuser;
   the diffuser has an internal reception face oriented towards the radiation fins and an external emission face whose surface area is greater than that of the internal reception face; and
   the internal reception face of the diffuser is substantially smooth and the external face is corrugated or has protrusions so as to present an emission surface area that is greater than the reception face surface area.

2. A radiation module according to claim 1, wherein the support is in the form of a receptacle and the diffuser constitutes a lid for the receptacle to form a closed space enclosing the temperature exchanging element and the heating element and/or heat conducting element.

3. A radiation module according to claim 1, wherein the radiation fins are substantially perpendicular to the base and are substantially parallel to one another, the fins and the base constituted by a single-piece.

4. A radiation module according to claim 1, wherein the radiation fins have an edge with a profile matching that of a reception means on the second face of the single-piece base of the temperature exchanging element, and the radiation fins are made integral with the base through the insertion of the matching profiles into the reception means.

5. A radiation module according to claim 1, wherein the radiation fins have a shape that is substantially that of the arc of a circle.

6. A radiation module according to claim 5, wherein the radiation fins are arranged concavely on one part of the base and convexly on the other part of the base.

7. A radiation module according to claim 6, wherein the temperature exchanging element includes a central element constituted by two fins of opposite curvature that are integral with one another.

8. A radiation module according to claim 1, wherein the radiation fins have a corrugated profile so as to increase the heat exchange surface.

9. A radiation module according to claim 1 including a plurality of the temperature exchanging elements, wherein each base of the plurality of the temperature exchanging elements includes a hooking means at two side ends, which enable each of the bases to be arranged side by side and joined together.

10. A radiation module according to claim 1, wherein the integration means for the heating element is in the form of rails between which the heating element may be inserted.

11. A radiation module according to claim 10, wherein the heating element is a woven resistor, a heating brick or a self-regulating resistance.

12. A radiation module according to claim 11, wherein the heating element is in the form of a flexible composite material, substantially flat and able to mould itself to the inner face of said base.

13. A radiation module according to claim 12, wherein the heating element is bonded to the inner face of the base and is powered by an electrical source.

14. A radiation module according to claim 1, wherein the heat conducting element is formed of a cooling element composed of at least one tube in which a heat conducting fluid circulates.

15. A radiation module according to claim 1, wherein the temperature exchanging element is made of extruded aluminum.

16. A radiation module according to claim 1, wherein the diffuser emits infrared radiation whose wave length is between 7 and 15 µm.

17. A temperature control device for a room or a vehicle that comprises:
    a temperature sensor; and
    at least one radiation module according to claim 1, and
    wherein the temperature control device is in an elongated shape and relatively narrow, so as to be used as a baseboard, a temperature exchanging profile for the ceiling, a post for an opening or a 360° radiation column.

18. A radiation module according to claim 1, wherein the diffuser emits infrared radiation whose wave length is between 7.4 and 10 µm.

* * * * *